United States Patent [19]

Ramm et al.

[11] Patent Number: 5,439,425
[45] Date of Patent: Aug. 8, 1995

[54] METHOD AND APPARATUS FOR CONTROLLING ENGAGEMENT AND DISENGAGEMENT OF THE CLUTCH AS A FUNCTION OF DISPLACEMENTS BETWEEN ENGINE AND VEHICLE BODY

[75] Inventors: Norbert Ramm; Frank Zimmermann, both of Braunschweig, Germany

[73] Assignee: Volkswagen A.G., Wolfsburg, Germany

[21] Appl. No.: 110,352

[22] Filed: Aug. 23, 1993

[30] Foreign Application Priority Data

Aug. 26, 1992 [DE] Germany .......................... 42 28 378.7

[51] Int. Cl.⁶ ............................................. F16H 61/02
[52] U.S. Cl. ..................................... 477/74; 477/174; 477/175; 180/293
[58] Field of Search .................... 477/78, 97, 115, 116, 477/117, 174, 175, 176, 71, 74, 80; 180/293, 300

[56] References Cited

U.S. PATENT DOCUMENTS

| | | | |
|---|---|---|---|
| 4,466,311 | 8/1984 | Hiramatsu | 477/174 X |
| 4,648,289 | 3/1987 | Kubo et al. | 477/138 |
| 4,667,787 | 5/1987 | Hofmann | 477/175 |
| 4,716,790 | 1/1988 | Sawada et al. | 477/97 X |
| 4,869,474 | 9/1989 | Best et al. | 180/300 X |
| 4,884,667 | 12/1989 | Koga | 477/80 X |
| 5,176,234 | 1/1993 | Reik et al. | 477/74 X |

FOREIGN PATENT DOCUMENTS

| | | |
|---|---|---|
| 2922030 | 12/1979 | Germany .......................... 180/293 |
| 3809118 | 10/1988 | Germany . |
| 382307 | 2/1989 | Germany . |
| 3920245 | 1/1990 | Germany . |
| 61-211548 | 9/1986 | Japan . |
| 62-225427 | 10/1987 | Japan . |
| 3009161 | 1/1991 | Japan . |
| 2197049 | 5/1988 | United Kingdom ................. 477/176 |

*Primary Examiner*—Dirk Wright
*Assistant Examiner*—Khoi Q. Ta
*Attorney, Agent, or Firm*—Brumbaugh, Graves, Donohue & Raymond

[57] ABSTRACT

A motor vehicle includes a drive system consisting of an engine and an electrohydraulically actuatable automatic transmission connected to the vehicle body by resilient mounts. To reduce stationary vibration of the vehicle and engagement and disengagement shock, the engagement pressure of a clutch in the transmission is controlled so that the clutch begins to slip when the strain between the drive system and the vehicle body reaches a selected value. The strain is determined by detecting the displacement of the drive system with respect to the body or the torque in the drive system or the stress in the resilient mounts.

13 Claims, 1 Drawing Sheets

DETECT STRAIN BETWEEN DRIVE SYSTEM AND VEHICLE BODY BY DETECTING TRANSMISSION OUTPUT TORQUE

CONTROL CLUTCH ENGAGEMENT PRESSURE TO CAUSE SLIP AT SELECTED STRAIN LEVEL BY GRADUALLY INCREASING ENGAGEMENT PRESSURE IN ACCORDANCE WITH A TIME RAMP HAVING A SLOPE DEPENDENT ON POSITION OF GAS PEDAL OR THROTTLE FLAP OR BY REDUCING MAIN PRESSURE LEVEL TO THE PRESSURE REQUIRED TO PROVIDE DESIRED CLUTCH SLIP TORQUE BY CONTROLLED SWITCHING OF CONTROL VALVE

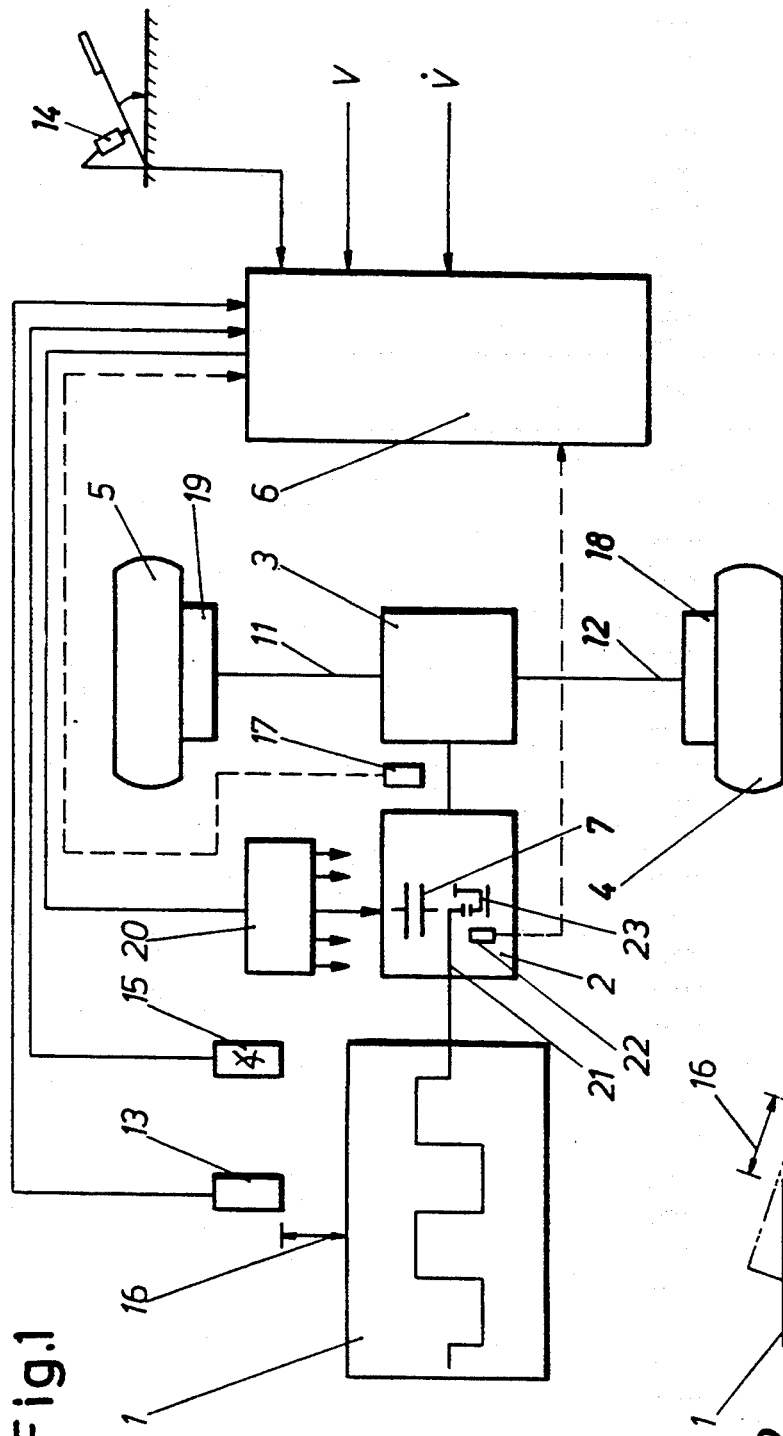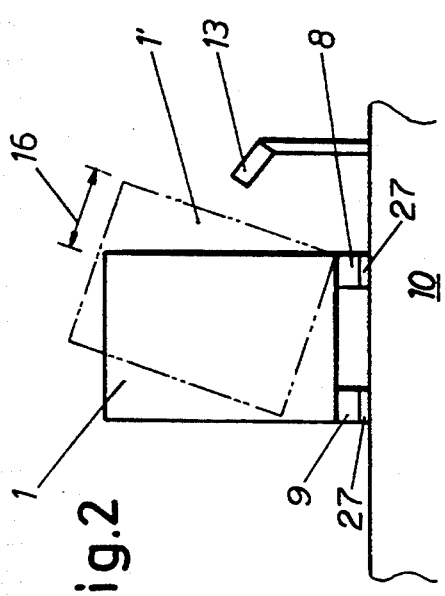

METHOD AND APPARATUS FOR CONTROLLING ENGAGEMENT AND DISENGAGEMENT OF THE CLUTCH AS A FUNCTION OF DISPLACEMENTS BETWEEN ENGINE AND VEHICLE BODY

BACKGROUND OF THE INVENTION

This invention relates to methods and apparatus for controlled engagement and disengagement of the clutch in the transmission of a motor vehicle drive system having an electrohydraulically actuatable automatic transmission and, more particularly, to a method and apparatus for reducing stationary vibration of the vehicle when in gear with the drive wheels braked and for reducing concussion during engagement and/or disengagement of the drive system.

When a motor vehicle having an automatic transmission is stationary and in gear with the drive wheels braked, so-called stationary vibration occurs. The cause of this vibration, which is disagreeable to the operator of the vehicle, is the opposition between the drive system, which produces a propulsive output, and the body of the vehicle, which receives this output but cannot pass it on to the wheels. This condition of the drive system is thus defined by the interrelationship between the torque of the drive system and the reaction torque of the vehicle body.

In prior art drive systems, such stationary vibration is avoided when the vehicle is stationary, in gear and the drive wheels are braked, by fully disengaging the clutch of the engaged gear so that there is no strain between the body and the drive system. In order to initiate driving from this condition, the slack in the clutch must first be taken up. In this time interval, during which the clutch is engaged but has not yet taken hold, the engine is free to race. Then, when the clutch finally takes hold, the engine speed has been elevated to produce an excessive output torque and the operator experiences a disagreeable engagement concussion. This makes clear that, by completely opening the clutch to avoid stationary vibration, another component of driving comfort has simply been traded off.

Both stationary vibration and engagement concussion are especially disadvantageous in drive systems having diesel engines. In such drive systems, a mechanical idling-speed governor normally maintains the engine at a relatively high minimum rotational speed. When the vehicle is braked but the clutch is not disengaged, this high engine speed and the comparatively hard action of the engine provide especially intense stationary vibrations. The same comparatively high idling speed of the diesel engine, however, also results in an especially hard engagement concussion when a previously disengaged clutch is engaged.

SUMMARY OF THE INVENTION

Accordingly, it is an object of the present invention to provide a method and apparatus for controlling the engagement of a clutch in a motor vehicle which overcomes the disadvantages of the prior art.

Another object of the invention is to provide a clutch control method and apparatus whereby stationary vibration and concussion upon clutch engagement and disengagement are avoidable and driving comfort can therefore be improved.

These and other objects of the invention are attained by providing an arrangement for detecting the driving relation between the drive system and the vehicle body and controlling the clutch engagement pressure in accordance therewith.

The invention is based on the realization that, with the normal nonrigid mounting of the drive system on the vehicle body, a displacement of the drive system relative to the body is detectable in certain operating conditions of the vehicle because of the manner by which the drive torque supplied by the drive system is transmitted to the drive wheels.

According to one embodiment of the invention, the displacement of the drive system relative to the vehicle body is utilized as a control parameter. Thus, according to the invention, the displacement of the drive system relative to the body is measured and a corresponding signal is delivered to a transmission control system. When the motor vehicle is stationary and in gear with the drive wheels braked, or is stationary in neutral, or is in gear and slowing through a predetermined speed and load level to a stop, the engaging pressure applied to the clutch of the transmission is adjusted by the transmission control system so that it begins to slip.

In this way, the strain of the drive system relative to the vehicle body can be freely regulated by the amount of slip torque. Stationary vibration is thereby avoided and, when the brake is not set, the tendency of the vehicle to creep is diminished. At the same time, the engagement and disengagement jerk when shifting into and out of gear can be diminished, providing a controlled and smooth shift.

In a particular embodiment of the method according to the invention, the clutch may be controlled by detecting and providing signals derived from the stress in the mounts for the drive system or from the instantaneous output torque of the transmission rather than by the displacement of the drive system relative to the vehicle body.

In carrying out the method of the invention, it is immaterial which transmission clutch is being used as the driving clutch at the time. Consequently stationary vibration and engagement or disengagement jerk are avoided in the same way during actuation of either a forward gear or the reverse gear.

Since the amount of slip torque in the clutch is closely related to the quality of the shifting operation, the magnitude of the slip torque to be effected during shifting may be preselected and stored as a parameter used in the transmission control system. The maximum allowable displacement for a preselected slip torque between the drive system and the vehicle body is chosen so that the deflection of the drive system with respect to the vehicle body is close to zero.

In another embodiment of the invention, the displacement of the drive system with the clutch completely open and with the clutch completely closed is detected at fixed intervals of time or travel by the transmission control system and the maximum allowable displacement of the drive system relative to the vehicle body is determined from that information.

The method according to the invention may also be employed during a transition from idling into a gear. With the brake actuated, the clutch, which is completely open during idling, is closed by increasing the clutch engagement pressure until the slip point of the clutch is identified by the transmission control system from the resulting displacement of the drive system with respect to the vehicle body. When the maximum displacement is attained, the clutch engagement pressure is held constant so that the slip torque then attained is also kept constant. If the brake is released in this situation, the pressure of the clutch is gradually increased by the transmission control system according to a time ramp. The slope of this time ramp depends on the operator's intention regarding acceleration as signalled by way of the gas pedal or by way of the angle at which the throttle is set on the engine. In this way, a smooth start with a high degree of riding comfort can be achieved.

In a simplified embodiment of the method according to the invention, the decrease or increase of the control pressure for the clutch from the main pressure level of the electrohydraulic transmission control to provide the required slip pressure for the clutch may be carried out by turning the hydraulic pressure control valve for the clutch on or off in a controlled manner. The clutch slip torque may thus be adjusted as a function of the main pressure level, the pressure distributors, and the on-off switching ratio of the clutch pressure control valve according to the maximum desired value of the clutch slip torque or the maximum allowable displacement distance of the drive system with respect to the vehicle body stored in the transmission control system.

One embodiment of the apparatus for controlling engagement or disengagement of a motor vehicle according to the invention includes a drive system consisting of an engine and an electrohydraulically controllable transmission in which the drive system is connected to the body of the motor vehicle by way of resilient mountings and includes a differential gear from which two drive shafts branch off, preferably connected by way of wheel brakes with two drive wheels. The arrangement further includes an electrohydraulic control system to actuate the elements of the transmission which is in communication with a transmission control system.

The transmission control system includes sensors for detecting the displacement of the drive system relative to the vehicle body, the angle of the engine throttle flap, the operation of a brake light switch, the vehicle speed, and the vehicle acceleration, and the control system provides appropriate signals to the electrohydraulic control system of the transmission.

In a particular embodiment of the invention, the drive system displacement sensor is a contactless system consisting of a permanent magnet and a magnetic field sensor.

Instead of a drive system displacement sensor, a torque sensor may be provided on the transmission output shaft to measure the strain between the drive system and the body.

In another embodiment, the strain between the drive system and the body may be ascertained from rotational speed variations by means of a rotational speed sensor arranged on the sun gear of a planetary transmission.

BRIEF DESCRIPTION OF THE DRAWINGS

Further objects and advantages of the invention will be apparent from a reading of the following description in conjunction with the accompanying drawings, in which:

FIG. 1 is a schematic diagram showing the general arrangement of a representative apparatus for controlling clutch engagement according to the invention; and FIG. 2 is a schematic view of a typical arrangement for detecting displacement motion of the drive system with respect to the vehicle body.

DESCRIPTION OF PREFERRED EMBODIMENTS

Figure 3:
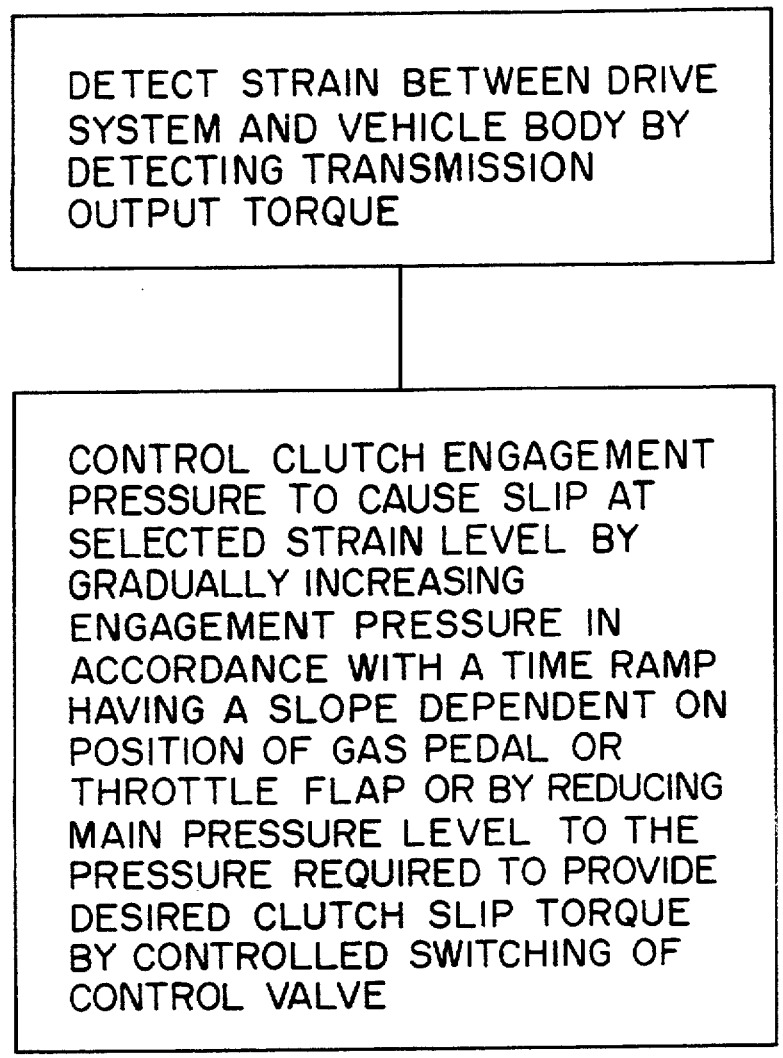
FIG. 3 is a chart illustrating the method of carrying out the invention.

The representative embodiment of a clutch control system according to the invention shown in FIGS. 1 and 2 includes an engine 1 and a transmission 2 fixedly flanged to each other and connected to a vehicle body 10 by way of resilient mountings 8 and 9 (FIG. 2). The transmission 2 is coupled through a main driveshaft to a differential 3 from which two wheel driveshafts 11 and 12 lead to corresponding drive wheels 5 and 4 having corresponding wheel brakes 19 and 18.

The transmission 2 is an electrohydraulically controllable automatic transmission which is controlled by an electrohydraulic control system 20. This electrohydraulic control system receives control instructions from a transmission control system 6 which, in turn, receives information about the displacement 16 of the drive system relative to the vehicle body from a displacement sensor 13, is informed as to the activation or passivation of the brake by a brake light switch 14, and detects the setting angle of the throttle flap at the engine from a sensor 15. In addition, the transmission control system 6 receives information about the velocity V of the vehicle at any time and computes the vehicle acceleration V from that information.

Instead of using the displacement sensor 13 to measure the displacement of the drive system relative to the vehicle body, a torque sensor 17 may alternatively be used to determine the strain between the drive system and the body at the output shaft of the transmission 2, or else a sensor 27 may be provided to measure the stress at the engine mountings 8 and 9 since such measurements provide the same information.

FIG. 2 is a schematic cross-section showing the effect of strain between the vehicle body and the drive system, in particular the engine 1. The displacement 16 of the drive system due to the strain between the drive system and the vehicle body 10 at the resilient mounts 8 and 9 is measured by the sensor 13. In an advantageous embodiment of the invention, the sensor used is a contactless system comprising a permanent magnet and a magnetic field sensor. Changes in distance between a magnet on the drive system and the sensor are converted directly into electrical signals and are supplied to the transmission control system.

In an especially advantageous embodiment of the invention, the zero location, that is, the location of the undeflected drive system, is detected and supplied to the transmission control system 6 whenever the clutch 7 is disengaged and the throttle is closed. If the operator then selects a gear while the brake is actuated, the clutch pressure is gradually increased by a proportional valve in the electrohydraulic control system 20 so that the clutch 7 slowly closes toward its slip point. When the slip point is reached, a slip torque results which depends on the contact pressure of the clutch 7 and the reaction torque of the drive system can be determined by the deflection of the drive system consisting of the engine 1 and the transmission 2 with respect to the vehicle body. The amount of the reaction torque can then be regulated to a desired level by the transmission control system by controlling the clutch pressure.

In order to take account of variations in the mounting of the drive system resulting, for example, from installation tolerances or aging of the mounts 8 and 9, provision is made for an adaptive adjustment between the reaction torque and the measured displacement 16 of the drive system. When the vehicle is new, the location of the drive system with respect to the vehicle is measured with the clutch 7 completely open and completely closed. The deflection value for the allowable measure of stress is determined as a fraction of the value with the clutch closed. The values obtained for minimum, maximum and allowable deflection of the drive system relative to the vehicle body are stored in the computer memory of the transmission control system and these values are automatically redetermined at fixed time intervals or after predetermined travel intervals.

One important advantage of the invention results from the fact that, by measuring the displacement of the drive system during the clutch engagement process when shifting into a selected gear, the shifting can be carried out in a controlled manner. This clutch engagement control process is merely a special case of the stationary clutch engagement control previously described. In the neutral setting of the shift lever of the automatic transmission, the clutch is necessarily open, and the zero location of the drive system is then identical with the zero location during the stationary disengagement operation. When going into a gear (forward or reverse), the increase in clutch engagement pressure takes place under the control of the transmission control system until the slip point is identified by detection of the deflection of the drive system by the sensor 13 and is passed on to the transmission control system.

As soon as the transmission control system 6 is notified by the throttle flap angle sensor 15 at the engine 1 and/or by the brake light sensor 14 at the brake pedal that a switch has been made from idling or braking to acceleration, the pressure in the clutch 7 is increased to the required value following a time ramp based on the throttle flap setting. The rate at which the clutch pressure is increased thus depends on the decision of the operator of the motor vehicle.

The method according to the invention is effective to control disengagement of the clutch when the vehicle is in motion as well as stationary. Thus, the method makes possible a comfortable transition from drive through coasting all the way to a standstill. In such a driving situation, the drive system 1 is initially deflected into its position 1'. The displacement distance 16 is determined by the sensor 13 and communicated to the transmission control means 6. Depending on the measured displacement and the previously fixed speed and load thresholds stored in the transmission control system, the clutch pressure of the transmission control system is then reduced by the electrohydraulic control system 20 until the clutch 7 begins to slip. The drive system thrust at which disengagement of the clutch is activated while the vehicle is in motion is regulated by the transmission control system 6 as a function of the vehicle deceleration, for example, high deceleration resulting from high brake pressure produces a large drive system deflection.

When a previously determined vehicle speed value is passed as the vehicle is slowing down and/or when a previously determined vehicle deceleration rate is exceeded, the pressure of the clutch is regulated so that the drive system is brought into the neighborhood of its zero deflection position. When the vehicle then comes to a stop, the drive system is already in its position of minimum strain. When the operator then moves the shift lever into the neutral position, the clutch 7 is not under pressure and the disengagement of the clutch is not perceptible.

In a much simplified embodiment of the method and apparatus according to the invention, the engagement pressure applied to the clutch 7 may be controlled in the region of the predetermined slip point by controlled switching of the electrohydraulic valve of the clutch on and off to produce a mean control pressure that is below the main pressure level of the electrohydraulic control system. The desired control pressure for the clutch then depends only on the main pressure level, the pressure distributors and the on-off switching ratio for the clutch pressure control valve. The level of the clutch pressure in this case need only be defined so that the clutch is at or just above the slip point and can transmit only a very little torque. In another embodiment shown in FIG. 1, the strain between the drive system and the body may be ascertained from rotational speed variations by means of rotational speed sensor 22 arranged on the sum gear 21 of a planetary transmission 23.

The advantage of this modification of the method is to be seen in that with a conventional control system for an automatic transmission, no additional sensor cost is required, and only a minimum amount of alteration of existing transmission control software is required.

Although the invention has been described herein with reference to specific embodiments, many modifications and variations therein will readily occur to those skilled in the art. Accordingly, all such variations and modifications are included within the intended scope of the invention.

We claim:

1. A method for controlling engagement of a clutch to which engagement pressure is applied in a transmission of a drive system for a motor vehicle which includes an engine, a body, drive wheels and an electrohydraulically actuatable automatic transmission so as to minimize stationary vibration when the vehicle is at a standstill and in gear with the drive wheels braked, as well as to reduce the concussion of clutch engagement, comprising the steps of detecting the strain between the drive system and the vehicle body by detecting the output torque of the transmission and controlling the engagement pressure of a clutch in the transmission to a level such that the clutch begins to slip when the vehicle is stationary and in gear with the drive wheels braked, or when the vehicle is stationary and out of gear, or when the vehicle is being decelerated to a standstill in gear and the vehicle speed and drive system load fall below a predetermined threshold level.

2. A method according to claim 1 including the step of engaging a previously disengaged clutch when going into gear from idling and when the vehicle is stationary, detecting a slip torque of the clutch as it is engaged by detecting the strain in the drive train, and continuing the engagement of the clutch until a predetermined slip torque of the clutch is reached.

3. A method for controlling engagement of a clutch to which engagement pressure is applied in a transmission of a drive system for a motor vehicle which includes an engine, a body, drive wheels and an electrohydraulically actuatable automatic transmission so as to minimize stationary vibration when the vehicle is at a standstill and in gear with the drive wheels braked, as well as to reduce the concussion of clutch engagement, comprising the steps of detecting the strain between the drive system and the vehicle body and controlling the engagement pressure of a clutch in the transmission to a level such that the clutch begins to slip when the vehicle is stationary and in gear with the drive wheels braked, or when the vehicle is stationary and out of gear, or when the vehicle is being decelerated to a standstill in gear and the vehicle speed and drive system load fall below a predetermined threshold level, wherein the gear for which the engagement pressure of a clutch is controlled is a gear into which the transmission is being shifted.

4. A method for controlling engagement of a clutch to which engagement pressure is applied in a transmission of a drive system for a motor vehicle which includes an engine, a body, drive wheels and an electrohydraulically actuatable automatic transmission so as to minimize stationary vibration when the vehicle is at a standstill and in gear with the drive wheels braked, as well as to reduce the concussion of clutch engagement, comprising the steps of detecting the strain between the drive system and the vehicle body and controlling the engagement pressure of a clutch in the transmission to a level such that the clutch begins to slip when the vehicle is stationary and in gear with the drive wheels braked, or when the vehicle is stationary and out of gear, or when the vehicle is being decelerated to a standstill in gear and the vehicle speed and drive system load fall below a predetermined threshold level, including the steps of predetermining and storing in a memory in the control system a slip torque of the clutch to be controlled.

5. A method according to claim 4 wherein the predetermined slip torque is selected so that the maximum allowable displacement distance between the drive system and the vehicle body is approximately zero.

6. A method according to claim 5 including the steps of determining, at fixed intervals of at least one of time and travel, the maximum allowable displacement of the drive system relative to the vehicle body with the clutch completely engaged compared to the displacement with the clutch completely disengaged.

7. A method for controlling engagement of a clutch to which engagement pressure is applied in a transmission of a drive system for a motor vehicle which includes an engine, a body, drive wheels and an electrohydraulically actuatable automatic transmission so as to minimize stationary vibration when the vehicle is at a standstill and in gear with the drive wheels braked, as well as to reduce the concussion of clutch engagement, comprising the steps of detecting the strain between the drive system and the vehicle body and controlling the engagement pressure of a clutch in the transmission to a level such that the clutch begins to slip when the vehicle is stationary and in gear with the drive wheels braked, or when the vehicle is stationary and out of gear, or when the vehicle is being decelerated to a standstill in gear and the vehicle speed and drive system load fall below a predetermined threshold level, including gradually increasing the engagement pressure of the clutch when the vehicle is in gear and the brake is released in accordance with a time ramp having a slope which depends on the position of one of a gas pedal and a throttle flap.

8. A method for controlling engagement of a clutch to which engagement pressure is applied in a transmission of a drive system for a motor vehicle which includes an engine, a body, drive wheels and an electrohydraulically actuatable automatic transmission so as to minimize stationary vibration when the vehicle is at a standstill and in gear with the drive wheels braked, as well as to reduce the concussion of clutch engagement, comprising the steps of detecting the strain between the drive system and the vehicle body and controlling the engagement pressure of a clutch in the transmission to a level such that the clutch begins to slip when the vehicle is stationary and in gear with the drive wheels braked, or when the vehicle is stationary and out of gear, or when the vehicle is being decelerated to a standstill in gear and the vehicle speed and drive system load fall below a predetermined threshold level, including the step of reducing the pressure level of an electrohydraulic control system of the transmission from a main pressure level to a pressure required to provide a desired clutch slip torque by controlled switching on and off of a control valve for the clutch.

9. Apparatus for controlling the engagement of a clutch in a motor vehicle comprising a motor vehicle having a body, a drive system including an engine and an automatic transmission connected to the body by resilient mountings, two drive wheels connected to the drive system through a differential and having corresponding wheel brakes, an electrohydraulic control system for actuating components of the automatic transmission, a detector for detecting strain between the drive system and the vehicle body, a throttle flap angle sensor for detecting the angle of an engine throttle flap, a brake light switch, a sensor for detecting the vehicle speed, and a transmission control system responsive to signals from the detector for detecting strain between the drive system and the vehicle, the throttle flap angle sensor, the brake light switch and the vehicle speed sensor and for controlling the engagement of a clutch in the transmission in accordance therewith.

10. Apparatus according to claim 9 wherein the detector for detecting strain between the drive system and the vehicle body is a displacement sensor for sensing displacement of the drive system with respect to the vehicle body, 11. Apparatus according to claim 9 wherein the detector for detecting strain between the drive system and the vehicle body is a torque sensor for sensing torque in the drive system, 12. Apparatus according to claim 9 wherein the detector for detecting strain between the drive system and the vehicle body is a sensor to measure the stress in the mounting connecting the drive system to the vehicle body, 13. Apparatus according to claim 9 wherein the automatic transmission includes a planetary gear set and including a sensor for detecting the rotational speed of the sun gear of the transmission.

* * * * *

UNITED STATES PATENT AND TRADEMARK OFFICE
CERTIFICATE OF CORRECTION

PATENT NO. : 5,439,425
DATED : August 8, 1995
INVENTOR(S) : Ramm et al.

It is certified that error appears in the above-indentified patent and that said Letters Patent is hereby corrected as shown below:

Title page, 2nd Column, 4th line, "382307" should read --3827307--;

Title page, 2nd Column, last line, "1 Drawing Sheets" should read --2 Drawing Sheets--; After Fig. 2 add --Fig. 3-- (Attached);

Column 6, line 19, "sum" should read --sun--.

Signed and Sealed this

Nineteenth Day of March, 1996

Attest:

BRUCE LEHMAN

Attesting Officer

Commissioner of Patents and Trademarks